United States Patent
Zhang et al.

(10) Patent No.: US 9,426,011 B2
(45) Date of Patent: Aug. 23, 2016

(54) REDUCING OUT-OF-BAND EMISSION

(71) Applicant: Commonwealth Scientific and Industrial Research Organisation, Campbell (AU)

(72) Inventors: Jian Zhang, Beecroft (AU); Xiaojing Huang, North Ryde (AU); Yingjie Jay Guo, Beecroft (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 14/324,829

(22) Filed: Jul. 7, 2014

(65) Prior Publication Data

US 2014/0321523 A1    Oct. 30, 2014

Related U.S. Application Data

(62) Division of application No. 13/516,288, filed as application No. PCT/AU2011/000081 on Jan. 27, 2011, now Pat. No. 8,798,558.

(51) Int. Cl.
*H04L 25/03*    (2006.01)
*H04L 27/26*    (2006.01)

(52) U.S. Cl.
CPC ...... *H04L 27/2602* (2013.01); *H04L 25/03012* (2013.01); *H04L 25/03828* (2013.01); *H04L 27/2626* (2013.01); *H04L 27/2634* (2013.01); *H04L 27/2647* (2013.01);
(Continued)

(58) Field of Classification Search
CPC ............ H04L 27/2647; H04L 27/2649; H04L 27/265; H04L 27/01

USPC .................................. 375/260, 229, 230, 232
See application file for complete search history.

(56) References Cited

U.S. PATENT DOCUMENTS

| 7,411,897 B2 | 8/2008 | Yoo et al. |
| 2006/0133261 A1 | 6/2006 | Cosovic et al. |

(Continued)

FOREIGN PATENT DOCUMENTS

| WO | 2009117874 A1 | 10/2009 |
| WO | 2011050392 A1 | 5/2011 |

OTHER PUBLICATIONS

A. M. Apostol, Calculus, p. 432, Blaisdell Publishing, N.Y, London, 1961.

(Continued)

*Primary Examiner* — Kevin Kim
(74) *Attorney, Agent, or Firm* — Wood, Herron & Evans, LLP (57) ABSTRACT

Disclosed is a transmitter for a communication system. The transmitter comprises a sidelobe suppression module configured to apply a suppression matrix to an input vector comprising symbols to be transmitted by the transmitter; a modulation module configured to modulate the precoded vector to a time-domain symbol using a plurality of subcarriers, each symbol in the precoded vector having a corresponding subcarrier; and a digital-to-analog conversion module configured to convert the time-domain symbol to an analog waveform for transmission. The suppression matrix is constructed such that emissions at one or more predetermined suppression distances lying outside a frequency band defined by the subcarriers are set to zero according to a predetermined emission model.

12 Claims, 7 Drawing Sheets

(52) U.S. Cl.
CPC ...... *H04L 27/2649* (2013.01); *H04L 25/03343* (2013.01); *H04L 2025/03414* (2013.01)

(56) References Cited

U.S. PATENT DOCUMENTS

2006/0198449 A1* 9/2006 De Bart et al. ............... 375/260
2010/0054115 A1 3/2010 Roh et al.

OTHER PUBLICATIONS

S. Brandes, I. Cosovic, M. Schnell, Reduction of out-of-band radiation in OFDM systems by insertion of cancellation carriers, ieee_coml, 10 (6):420-422, 2006.
G. Cuypers, K. Vanbleu, G. Ysebaert, M. Moonen, Intra-symbol windowing for egress reduction in DMT transmitters, EURASIP J. Appl. Signal Process., Article ID 70387:1-9, 2006.
El-Saadany, Mahmoud S., Shalash, Ahmed F., Abdallah, Mohamed, Revisiting active cancellation carriers for shaping the spectrum of OFDM-based cognitive radios, SARNOFF'09, pp. 526-530, Piscataway, NJ, USA, 2009. IEEE Press.
S. Haykin, Cognitive radio: Brain-empowered wireless communications, ieee_isac, 23(2):201-220, 2005.
Yuan-Pei Lin, See-May Phoong, BER minimized OFDM systems with channel independent precoders, ieee_sp, 51 (9):2369-2380, 2003.
Yuan-Pei Lin, See-May Phoong, OFDM transmitters: analog representation and DFT-based implementation, Signal Processing, IEEE Transactions on, 51(9):2450-2453, 2003.
Meng Ma, Xiaojing Huang, Guo, Y. Jay, An interference self-cancellation technique for SC-FDMA systems, Communications Letters, IEEE, 14(6):512-514, 2010.
H. A. Mahmoud, H. Arslan, Sidelobe suppression in OFDM-based spectrum sharing systems using adaptive symbol transition, ieee_coml, 12 (2):133-135, 2008.
Hyung G. Myung, Junsung Lim, David J. Goodman, Single Carrier FDMA for Uplink Wireless Transmission, IEEE Vehicular Technology Magazine, pp. 30-38, 2006.
Daiming Qu, Zhiqiang Wang, Extended Active Interference Cancellation for Sidelobe Suppression in Cognitive Radio OFDM Systems With Cyclic Prefix, ieee_vt, 59 (4):1689-1695, 2010.
Song-Gui Wang, Shein-Chung Chow, Advanced Linear Models: Thoery amd Applications, Marcel Dekker, Inc., New York, 1994.
Zhengdao Wang, Linear Precoding for Wireless Communications, PhD Thesis, The University of Minnesota, 2002.
van Waterschoot, T., Le Nir, V., Duplicy, J., Moonen, M., Analytical Expressions for the Power Spectral Density of CP-OFDM and ZP-OFDM Signals, Signal Processing Letters, IEEE, 17(4):371-374, 2010.
Renhui Xu, Ming Chen, A Precoding Scheme for DFT-Based OFDM to Suppress Sidelobes, ieee_coml, 13 (10)776-778, 2009.
H. Yamaguchi, Active interference cancellation technique for MB-OFDM cognitive radio, Proc. 34th IEEE Eur. Microw. Conf., pp. 1105-1108, 2004.
Izuka, N., Daido, Y., Mizuno, S., Yamakita, Y., Spectrum-shaping method to improve spectral efficiency of OFDM systems, Communication Systems, 2002. ICCS 2002, 8th International Conference, Nov. 25-28, 2002, vol. 1 , pp. 234-238.
Pagadarai, S., Wyglinski, A.M., Rajbanshi, R., A Novel Sidelobe Suppression Technique for OFDM-Based Cognitive Radio Transmission, New Frontiers in Dynamic Spectrum Access Networks, 2008, DySPAN 2008, 3rd IEEE Symposium, Oct. 14-17, 2008, pp. 1-7.
Zhou Yuan, Pagadarai, S., Wyglinski, A.M., Cancellation carrier technique using genetic algorithm for OFDM sidelobe suppression, Military Communications Conference, 2008, MILCOM 2008, IEEE, Nov. 16-19, 2008, pp. 1-5.
Zhou Yuan, Wyglinski, A.M., On Sidelobe Suppression for Multicarrier-Based Transmission in Dynamic Spectrum Access Networks, Vehicular Technology, IEEE Transactions, May 2010, vol. 59, Issue 4, pp. 1998-2006.

Daiming Qu, Zhiqiang Wang, Tao Jiang, Extended Active Interference Cancellation for Sidelobe Suppression in Cognitive Radio OFDM Systems With Cyclic Prefix, Vehicular Technology, IEEE Transactions, vol. 59, Issue 4, Digital Object Identifier 10.1109/TVT.2010.2040848, Publication Year 2010, pp. 1689-1695.
Pagadarai, S., Wyglinski, A.M., Rajbanshi, R., A sub-optimal sidelobe suppression technique for OFDM-based cognitive radios, Military Communications Conference, 2008, MILCOM 2008, IEEE, Digital Object Identifier: 10.1109/MILCOM.2008.4753556, Publication Year 2008, pp. 1-6.
Zhou Yuan, Wyglinski, A.M., On Sidelobe Suppression for Multicarrier-Based Transmission in Dynamic Spectrum Access Networks, Vehicular Technology, IEEE Transactions on, vol. 59, Issue 4, Digital Object Identifier: 10.1109/TVT.2010.2044428, Publication Year 2010, pp. 1998-2006.
Dong Li, Xianhua Dai, Han Zhang, Sidelobe suppression in NC-OFDM systems using constellation adjustment, Communications Letters, IEEE, vol. 13, Issue 5, Digital Object Identifier: 10.1109/LCOMM.2009.090031, Publication Year 2009, pp. 327-329.
Pagadarai, S., Wyglinski, A.M., Rajbanshi, R., A Novel Sidelobe Suppression Technique for OFDM-Based Cognitive Radio Transmission, New Frontiers in Dynamic Spectrum Access Networks, 2008, DySPAN 2008, 3rd IEEE Symposium on, Digital Object Identifier: 10.1109/DYSPAN.2008.10, Publication Year 2008, pp. 1-7.
Zhou Yuan, Wyglinski, A.M., Cognitive radio-based OFDM sidelobe suppression employing modulated filter banks and cancellation carriers, Military Communications Conference, 2009, MILCOM 2009, IEEE, Digital Object Identifier: 10.1109/MILCOM.2009.5379927, Publication Year 2009, pp. 1-5.
Xiao Fu, Jun Wang, Shao Qian Li, Sidelobe suppression for OFDM based cognitive radio systems, Communications and Networking in China, 2009, ChinaCOM 2009, Fourth International Conference on, Digital Object Identifier: 10.1109/CHINACOM.2009.5339744, Publication Year 2009, pp. 1-5.
Cosovic, I., Brandes, S., Schnell, M., A technique for sidelobe suppression in OFDM systems, Global Telecommunications Conference, 2005, GLOBECOM '05, IEEE, vol. 1, Digital Object Identifier: 10.1109/GLOCOM.2005.1577381, Publication Year 2005.
Dong Li, Xianhua Dai, Han Zhang, Sidelobe Suppression in NC-OFDM Systems using Phase Shift, Wireless Communications, Networking and Mobile Computing, 2008, WiCOM '08, 4th International Conference on, Digital Object Identifier: 10.1109/WiCom.2008.297, Publication Year 2008, pp. 1-4.
Cosovic, I., Brandes, S., Schnell, M., Subcarrier weighting: a method for sidelobe suppression in OFDM systems, Communications Letters, IEEE, Digital Object Identifier: 10.1109/LCOMM.2006.1638610, Publication Year 2006, pp. 444-446.
Ahmed, S., Rehman, R.U., Humor Hwang, New Techniques to Reduce Sidelobes in OFDM System, Convergence and Hybrid Information Technology, 2008, ICCIT '08, Third International Conference on, vol. 2, Digital Object Identifier: 10.1109/ICCIT.2008.157, Publication Year 2008, pp. 117-121.
Mahmoud, H.A., Arslan, H., Sidelobe suppression in OFDM-based spectrum sharing systems using adaptive symbol transition, Communications Letters, IEEE, vol. 12, Issue: 2, Digital Object Identifier: 10.1109/LCOMM.2008.071729, Publication Year 2008. pp. 133-135.
Brandes, S., Cosovic, I., Schnell, M., Reduction of out-of-band radiation in OFDM based overlay systems, New Frontiers in Dynamic Spectrum Access Networks, 2005, DySPAN 2005, 2005 First IEEE International Symposium on, Digital Object Identifier: 10.1109/DYSPAN.2005.1542691, Publication Year 2005, pp. 662-665.
Brandes, S., Cosovic, I., Schnell, M., Reduction of out-of-band radiation in OFDM systems by insertion of cancellation carriers, Communications Letters, IEEE, vol. 10, Issue 6, Digital Object Identifier: 10.1109/LCOMM.2006.1638602, Publication Year 2006, pp. 420-422.
Jaap van de Beek, Member and Fredrik Berggren, N-continuous OFDM, IEEE Comms. Letters, vol. 13, No. 1, Jan. 2009.

(56) References Cited

OTHER PUBLICATIONS

International Bureau of WIPO, International Preliminary Report on Patentability (2 pgs.) and Written Opinion of the International Searching authority (6 pgs.), PCT/AU2011/000081, Aug. 8, 2013.
Cosovic et al., "Subcarrier Weighting: A Method for Sidelobe Suppression in OFDM Systems," IEEE Communications Letter, vol. 10, No. 6, Jun. 2006, pp. 444-446 Sections II, III.
Xu et al., "Spectral Leakage Suppresion of DFT-based OFDM via Adjacent Subcarriers Correlative Coding," Proceedings of IEEE Global Telecommunications Conference (IEEE GLOBECOM), Nov. 30, 2008-Dec. 4, 2008.
Chung, "Spectral Precoding for Constant-Envelope OFDM," IEEE Transactions on Communications, vol. 58, No. 2, Feb. 2010, pp. 555-567.
Xu et al., "Performance Improvement of OFDM System with the Spectrum-Sidelobe-Suppressed Precoding," IEEE Vehicular Technology Conference, Sep. 6-9, 2010.
Chen et al., "Novel Prototype Filter Design for FBMC Based Cognitive Radio System Through Direct Optimization of Filter Coefficients," Proceedings of International Conference on Wireless Communications and Signal Processing (WCSP), Oct. 21-23, 2010.
Australian Patent Office, International Search Report, PCT/AU2011/000081, Mar. 24, 2011 (6 pgs.).

* cited by examiner

REDUCING OUT-OF-BAND EMISSION

TECHNICAL FIELD

The present invention relates generally to communication systems and, in particular, to sidelobe suppression or out-of-band emission reduction in multicarrier communication systems.

BACKGROUND

Multicarrier systems, such as orthogonal frequency-division multiplexing (OFDM), are widely employed in broadband communication due to their high spectrum efficiency and simple frequency domain equalisation in dense multipath channels. Spectrum shaping, in particular sidelobe suppression, is an important design consideration in such systems. The waveform of each OFDM subcarrier is inherently a sine function, and the power of sine sidelobes decays slowly as $f^2$, where f is the frequency distance to the main lobe. The problem of sidelobe suppression becomes more significant when multicarrier modulation is applied in cognitive radio, where instantaneously spare frequency bands in primary systems are proposed to be used by intelligent secondary systems. Such secondary systems need to ensure that their transmitted signal has very sharp spectrum roll-off to maximise their usable bandwidth and minimise interference to primary systems.

Figure 1:
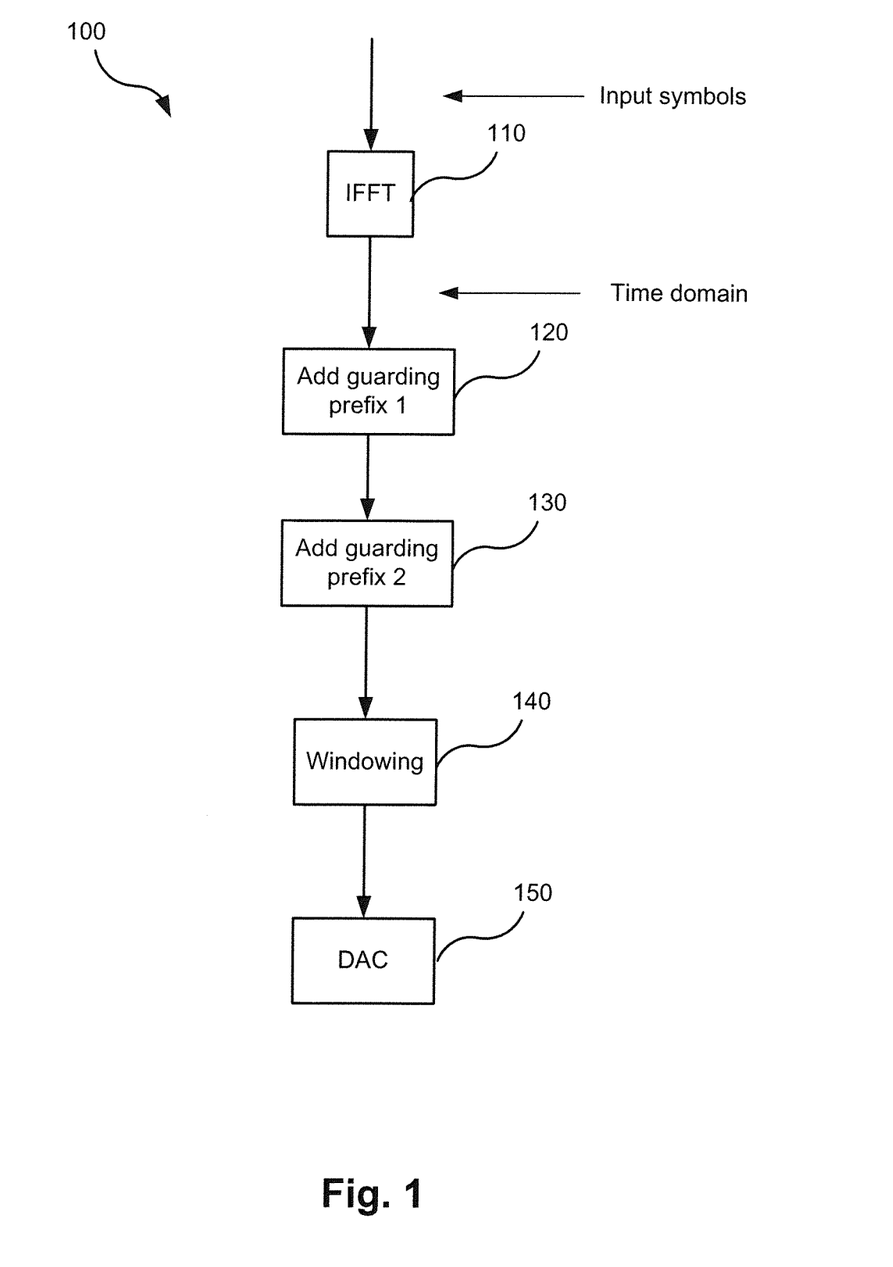
FIG. 1 illustrates conventional sidelobe suppression in an OFDM transmitter.

Conventionally, time-domain windowing, such as raised cosine windowing, is applied for sidelobe suppression (out-of-band emission reduction). FIG. 1 illustrates an OFDM transmitter 100 with conventional sidelobe suppression. The transmitter 100 has an Inverse Fast Fourier Transform module 110 to convert a sequence of input symbols to a time-domain OFDM symbol. The first guarding prefix is then added to the OFDM symbol at the module 120 to avoid the interference due to multipath delay spread, and the second guarding prefix is added at the module 130 to avoid distortions caused by the time-domain windowing for sidelobe suppression performed by the module 140. A digital-to-analog conversion module 150 converts the windowed time-domain OFDM symbol to an analog waveform.

The length of the guarding interval of the second guarding prefix added at the module 130 depends on the spectrum sharpness to be achieved. The sharper the roll-off of the spectrum needs to be, the longer the guarding interval required. Furthermore, some guarding subcarriers in the two edges of the band are also needed in order to complement the windowing effect. As a result, the spectrum efficiency can be significantly reduced by the windowing module 140. In addition, it is difficult for the time-domain windowing module 140 to achieve large enough out-of-band emission reduction in cognitive radios where multicarrier modulation over non-contiguous subbands is frequently employed. In these applications, a straightforward technique is to apply notch filters to the unallocated subbands. However, a digital implementation of a notch filter would increase the processing complexity considerably, and an analog implementation would be costly and difficult to adapt to dynamic band allocation.

Recently, some signal pre-distortion (precoding) techniques have been proposed for sidelobe suppression. These techniques can be classified into two classes: 1) cancelling out-of-band emission from data subcarriers by optimising the signals at reserved subcarriers; and 2) pre-distorting data symbols to minimise their combined out-of-band emission. Class 1 techniques can achieve good sidelobe suppression, but lead to signal-to-noise power ratio (SNR) degradation in the receiver as power is wasted at the reserved subcarriers. Furthermore, their complexity, which is proportional to the number of points to be cancelled in the sidelobe, could be quite high for large suppression. Class 2 techniques optimise a precoding matrix via some cost function of the out-of-band emission. These techniques have the advantage of maintaining the receiver SNR by using an orthogonal precoding matrix. However, their computational complexity is proportional to the square of the number of subcarriers in the band of interest and is therefore impractical for most applications.

SUMMARY

It is an object of the present invention to substantially overcome, or at least ameliorate, one or more disadvantages of existing arrangements.

Disclosed are systems and methods for out-of-band emission reduction in multicarrier systems. The disclosed methods use signal precoding by a precoding matrix configured to minimise emissions at certain out-of-band frequencies, thereby generally lowering out-of-band emissions. At least one subcarrier is reserved for recovering the transmitted symbols at the receiver in the presence of the inter-symbol interference (ISI) introduced by the precoding matrix.

The disclosed methods do not use any guard band or any dedicated time-domain cancellation symbol, so the spectral efficiency and power efficiency are improved over the conventional windowing approach. In addition, the disclosed methods generally achieve a better balance between sidelobe suppression performance and complexity than conventional methods. They also have a clear physical interpretation, thus enabling flexible and straightforward parameter configuration.

According to a first aspect of the present invention, there is provided a transmitter for a communication system, the transmitter comprising: a sidelobe suppression module configured to apply a suppression matrix to an input vector comprising symbols to be transmitted by the transmitter; a modulation module configured to modulate the precoded vector to a time-domain symbol using a plurality of subcarriers, each symbol in the precoded vector having a corresponding subcarrier; and a digital-to-analog conversion module configured to convert the time-domain symbol to an analog waveform for transmission, wherein the suppression matrix is constructed such that emissions at one or more predetermined suppression distances lying outside a frequency band defined by the subcarriers are set to zero according to a predetermined emission model.

According to a second aspect of the present invention, there is provided a receiver for a communication system over a channel, the receiver comprising: a demodulation module configured to convert a time-domain received symbol to a vector of received symbols, each received symbol corresponding to a subcarrier, each subcarrier being a data subcarrier or a reserved subcarrier on which a zero symbol was transmitted; and an equalisation module configured to: equalise the received symbol vector based on the characteristics of the channel, and estimate an input symbol vector from the equalised symbol vector.

According to a third aspect of the present invention, there is provided a method of transmitting a symbol sequence over a communication channel, the method comprising: applying a suppression matrix to an input vector comprising symbols from the symbol sequence; modulating the precoded vector to a time-domain symbol using a plurality of subcarriers, each symbol in the precoded vector having a corresponding subcarrier; and converting the time-domain symbol to an analog waveform for transmission, wherein the suppression matrix is constructed such that emissions at one or more predetermined suppression distances lying outside a frequency band defined by the subcarriers are set to zero according to a predetermined emission model.

According to a fourth aspect of the present invention, there is provided a method of receiving a symbol sequence over a communication channel, the method comprising: converting a time-domain received symbol to a vector of received symbols, each received symbol corresponding to a subcarrier, each subcarrier being a data subcarrier or a reserved subcarrier on which a zero symbol was transmitted; equalising the received symbol vector based on the characteristics of the channel; and estimating the symbol sequence from the equalised symbol vector.

DESCRIPTION OF THE DRAWINGS

At least one embodiment of the present invention will now be described with reference to the drawings, in which.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

Figure 2:
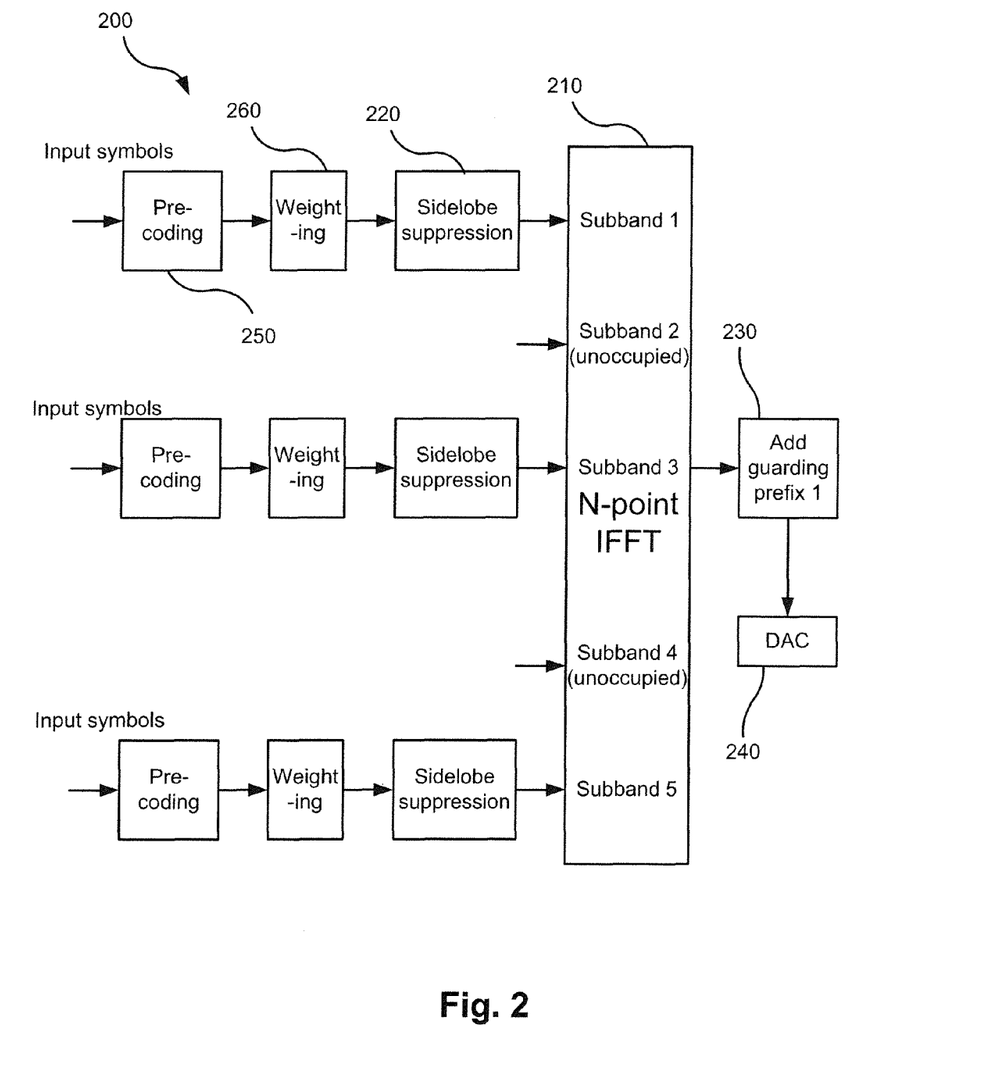
FIG. 2 is a block diagram of a transmitter of a communication system, within which embodiments of the invention may be practised.

FIG. 2 is a block diagram of a transmitter 200 of a multicarrier communication system, also known as a precoding OFDM system, within which embodiments of the invention may be practised. The multicarrier communication system may be wired or wireless. The transmitter 200 receives multiple sequences of input data symbols from respective sources. Each sequence of symbols is to be transmitted in a separate subband of the communication system band. The total number of subcarriers in the band is denoted as N. The N subcarriers in the band are partitioned into one or more contiguous, disjoint subsets, and each subset of the subcarriers defines a subband of the multicarrier communication system. The number of subcarriers allocated to each subband can be different, and some subbands may not be used for information transmission. This scheme is applicable to communication systems such as conventional OFDM, localized single carrier—frequency division multiple access (SC-FDMA) in mobile long-term evolution (LTE), and cognitive radio.

Figure 3:
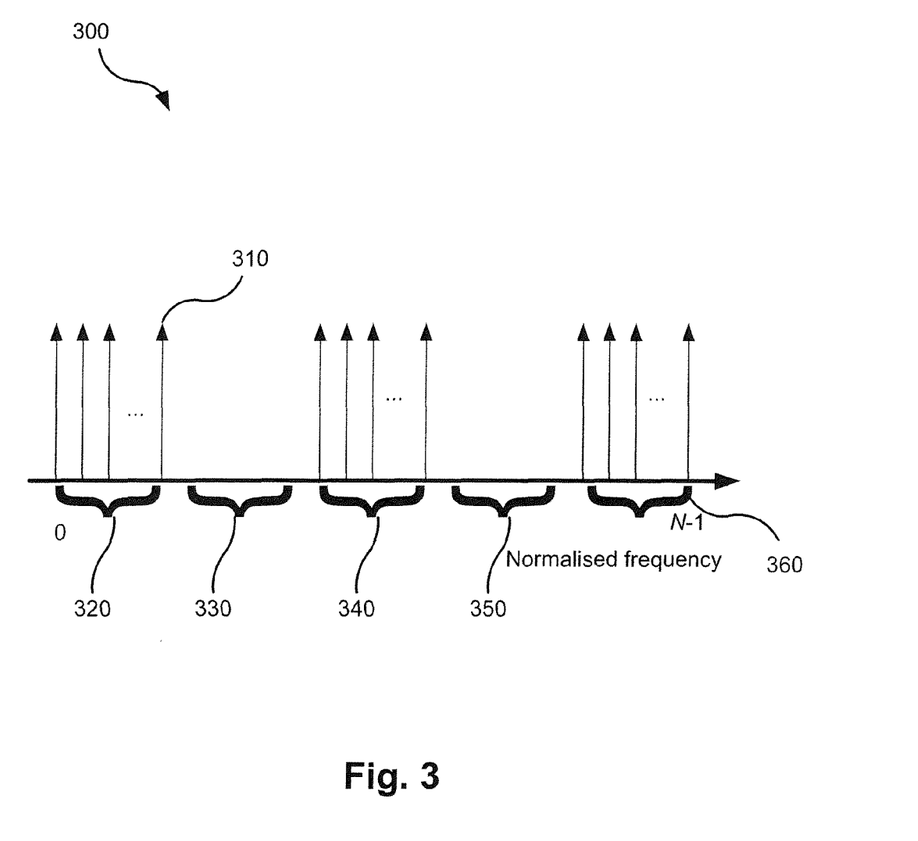
FIG. 3 shows an example allocation of subcarriers to subbands in the transmitter of FIG. 2.

FIG. 3 shows an example allocation 300 of subcarriers, e.g. 310, to subbands 1 to 5 (320, 330, 340, 350, and 360 respectively) in the transmitter 200 of FIG. 2. Subbands 2 and 4 are not used for information transmission, i.e. zeros are transmitted on the subcarriers allocated to subbands 2 and 4.

The number of subbands may be one, in which case all N subcarriers are allocated to that subband.

Each sequence of input symbols to the transmitter 200 is passed through a precoding module, e.g. 250, which applies a precoding matrix to the input symbols. For DFT-OFDM or SC-FDMA, this precoding matrix is an FFT matrix, and for a conventional OFDM system, it is an identity matrix. The output of the precoding module 250 is weighted by a diagonal phase shifting matrix in a weighting module, e.g. 260. For DFT-OFDM, the diagonal elements of this phase shifting matrix are a pseudo random sequence, and this matrix is known to the receiver. For a conventional OFDM system, the phase shifting matrix is an identity matrix. The output of the weighting module 260 is then passed through a sidelobe suppression module, e.g. 210. The sidelobe-suppressed symbol sequences from all the occupied subbands are passed to a modulation module 220 for conversion to a time-domain symbol. In the OFDM case, the modulation module 220 is an N-point Inverse Fast Fourier Transform (IFFT) module. A guarding prefix module 230 adds a guarding prefix to the time-domain symbol, and a digital-to-analog conversion module 240 converts the time-domain symbol to an analog waveform for transmission.

Each sidelobe suppression module, e.g. 210, operates independently of and executes the same method as the other sidelobe suppression modules. The following therefore describes only the sidelobe suppression module 210.

The sidelobe suppression module 210 operates in subband 1 comprising M sub carriers, where M≤N, indexed by m=0, . . . , M−1. The subcarrier frequency interval is denoted as $\delta_f$. The M-vector of signal samples at the M subcarriers is denoted as $\tilde{x}=[\tilde{x}_0, \tilde{x}_1, \ldots, \tilde{x}_{M-1}]$. The power emitted by the M subcarriers in the frequency range f<0 and f>(M−1) $\delta_f$ is referred to as out-of-band emission or sidelobe power.

The goal of the sidelobe suppression module 210 is to reduce the amount of out-of-band emission. The following description is formulated on the basis of an analog emission model with a sinc kernel function, though other formulations based on other emission models such as the DFT model based on a periodic sinc kernel may be contemplated.

Under the sinc-kernel analog model, the emitter power b at a frequency to, which is normalized to the frequency interval $\delta_f$, from M subcarriers is given by $$b(\omega) = \frac{1}{2\pi j} \sum_{m=0}^{M-1} c_m(\omega)\phi_m(\omega)\tilde{x}_m \quad (1)$$

where $$c_m(\omega) = \begin{cases} \frac{1}{|m-\omega|}, & \omega \neq m \\ 1, & \omega = m \end{cases} \quad (2)$$

$$\phi_m(\omega) = \begin{cases} \mathrm{sgn}(m-\omega)(e^{-j2\pi\omega}-1), & 0 \leq \omega < M-1 \\ \mathrm{sgn}(\omega)(e^{-j2\pi\omega}-1), & \omega < 0, \omega > M-1 \end{cases} \quad (3)$$

The sidelobe suppression module 210 reduces sidelobe power by setting the emission b(ω) according to the emission model to zero at p distinct (normalised) frequencies denoted as $\omega_0, \omega_2, \ldots, \omega_{p-1}$ and referred to herein as suppression distances, where p is greater than or equal to one. Each of the p suppression distances $\omega_i$ (i=0, . . . , p−1) lies outside the subband frequency range [0, M−1].

Using equations (1) to (3), the p-vector b of emissions at the suppression distances according to the sine-kernel analog model can be represented as $$b = \frac{1}{2\pi j} \Phi C^T \tilde{x} \qquad (4)$$

where C is a M by p matrix defined as $$C = \begin{pmatrix} c_0(\omega_0) & c_0(\omega_1) & \ldots & c_0(\omega_{p-1}) \\ c_1(\omega_0) & c_1(\omega_1) & \ldots & c_1(\omega_{p-1}) \\ \vdots & \vdots & \ddots & \vdots \\ c_{M-1}(\omega_0) & c_{M-1}(\omega_1) & \ldots & c_{M-1}(\omega_{p-1}) \end{pmatrix} \qquad (5)$$

and $\Phi$ is a p by p diagonal matrix with the i-th diagonal element being equal to $\text{sgn}(\omega_i)(e^{-2\pi j \omega_i} - 1)$.

The sidelobe suppression module 210 reduces sidelobe power by multiplying an M-vector z of symbols, being the input to the sidelobe suppression module 210, by an M by M suppression matrix P to obtain the signal vector $\hat{x}$, where P is constructed so that b=0. In practice, the actual emissions at the suppression distances cannot be exactly zero, but under this construction of the suppression matrix P, approach zero as the sampling rate approaches infinity.

In one implementation, P is constructed as follows:

$$P = I_M - C(C^T C)^{-1} C^T \qquad (6)$$

where $I_M$ is the identity matrix of size M by M. When C is a matrix of full column rank, i.e. rank(C)=p, which is usually the case provided the suppression distances $\omega_0, \omega_2, \ldots, \omega_{p-1}$ are widely spaced, multiplication of input vector z by the suppression matrix P constructed according to equation (6) performs the orthogonal projection of z onto the null space of $C^T$. Since the rank of $C^T$ is p, the rank of P is less than or equal to M−p. Other implementations contemplate different constructions of the suppression matrix P, with the goal of achieving b=0 and thereby reducing the out-of-band emission.

To suppress sidelobes equally on two sides of a subband, p is chosen as an even number, and the suppression distances are chosen in symmetric pairs on either side of the subband. The symmetric "pair" suppression distance of a (normalised) suppression distance $\omega_i$ is given by $\omega_{p-1-i} = M-1-\omega_i$.

The multiplication of z by P effectively introduces intersymbol interference (ISI) to the input vector z. For sidelobe suppression purposes, the design of the suppression matrix P is independent of the input vector z and there is no restriction on the values of z. However, since the rank of P is less than or equal to M−p, P is not invertible as long as p>0. The unprecoded symbol vector z therefore cannot in general be recovered from Pz. The ISI becomes the performance-limiting factor when noise power is low.

To enable ISI-free symbol recovery, some of the M subcarriers in the subband are reserved to transmit a zero symbol. The number q of reserved subcarriers is greater than or equal to p. The q reserved subcarriers should be spaced as widely as possible within the subband in order to minimise noise enhancement at the receiver. To minimise out-of-band emissions, at least one reserved subcarrier should be allocated to each edge of the subband. Thus in one implementation, the set S of indices of reserved subcarriers is defined with even spacing within the subband as follows:

$$S = \{0, v-1, 2v-1, \ldots, (q-2)v-1, M-1\} \qquad (7)$$

where $$v = \text{floor}\left(\frac{M}{q-1}\right) \qquad (8)$$

Let an (M−q)-vector $\tilde{s}$ denote the M−q symbols assigned to the M−q unreserved subcarriers before the sidelobe suppression module 210. The vector $\tilde{s}$ represents the non-zero elements in z. The vector $\tilde{s}$ represents the input symbols to be transmitted in one subband of the transmitter 200 for conventional OFDM systems, or the output of the weighting module 260 in a precoding OFDM system such as DFT-OFDM. Using equation (6), the vector $\tilde{x}$ of precoded symbols that is passed to the IFFT module 220 to modulate the M subcarriers allocated to the subband is given by $$\tilde{x} = \sqrt{\lambda}(I_M - C(C^T C)^{-1} C^T) z \qquad (9)$$

where the scaling factor $\lambda$ is introduced so that the mean power $E\{\|\tilde{x}\|^2\}$ of $\tilde{x}$ is 1, and the elements $z_k$ (k=0, . . . , M−1) of the input vector z are defined as $$z_k = \begin{cases} 0, & k \in S \\ \tilde{s}_{g(k)}, & k \notin S \end{cases} \qquad (10)$$

where g(k) is a function that maps the indices k of the unreserved subcarriers to the indices 0, . . . , M−q−1 of $\tilde{s}$.

Three implementations of sidelobe suppression according to equations (9) and (10) are now described.

Implementation A:

Single-sided sidelobe suppression with p=q=1.

$$\tilde{x} = \sqrt{\lambda}\left(I_M - c(c^T c)^{-1} c^T\right)\begin{pmatrix} 0 \\ \tilde{s} \end{pmatrix} \qquad (11)$$

where $\tilde{s}$ is an (M−1)-vector of data symbols, and $$c = \left[\frac{1}{-\omega_0}, \frac{1}{1-\omega_0}, \ldots, \frac{1}{M-1-\omega_0}\right]^T \qquad (12)$$

for suppressing sidelobes with (normalised) suppression distance $\omega_0 < 0$, or $$c = \left[\frac{1}{M-1-\omega_0}, \frac{1}{M-2-\omega_0}, \ldots, \frac{1}{-\omega_0}\right]^T \qquad (13)$$

for suppressing sidelobes with (normalised) suppression distance $\omega_0 > M-1$.

Implementation B:

Double-sided sidelobe suppression with p=q=2.

The "pair" suppression distance of $\omega_0 < 0$ is M−1−$\omega_0$. Thus the matrix C becomes $$C = \begin{pmatrix} \frac{1}{-\omega_0} & \frac{1}{1-\omega_0} & \cdots & \frac{1}{M-1-\omega_0} \\ \frac{1}{M-1-\omega_0} & \frac{1}{M-2-\omega_0} & \cdots & \frac{1}{-\omega_0} \end{pmatrix}^T, \omega_0 < 0 \quad (14)$$

and $\tilde{z}=[0,\tilde{s}^T,0]^T$, where $\tilde{s}$ is an (M−2)-vector of data symbols.

Implementation C:

Double-sided sidelobe suppression with p=q=4.

The four suppression distances $\omega_p$ are $\omega_0$−M/2, $\omega_0$, M−1−$\omega_0$, and 3M/2−1−$\omega_0$, for $\omega_0<0$. The indices S of the q reserved subcarriers are 0, floor(M/3)−1, 2*floor(M/3)−1, and M−1.

Figure 4:
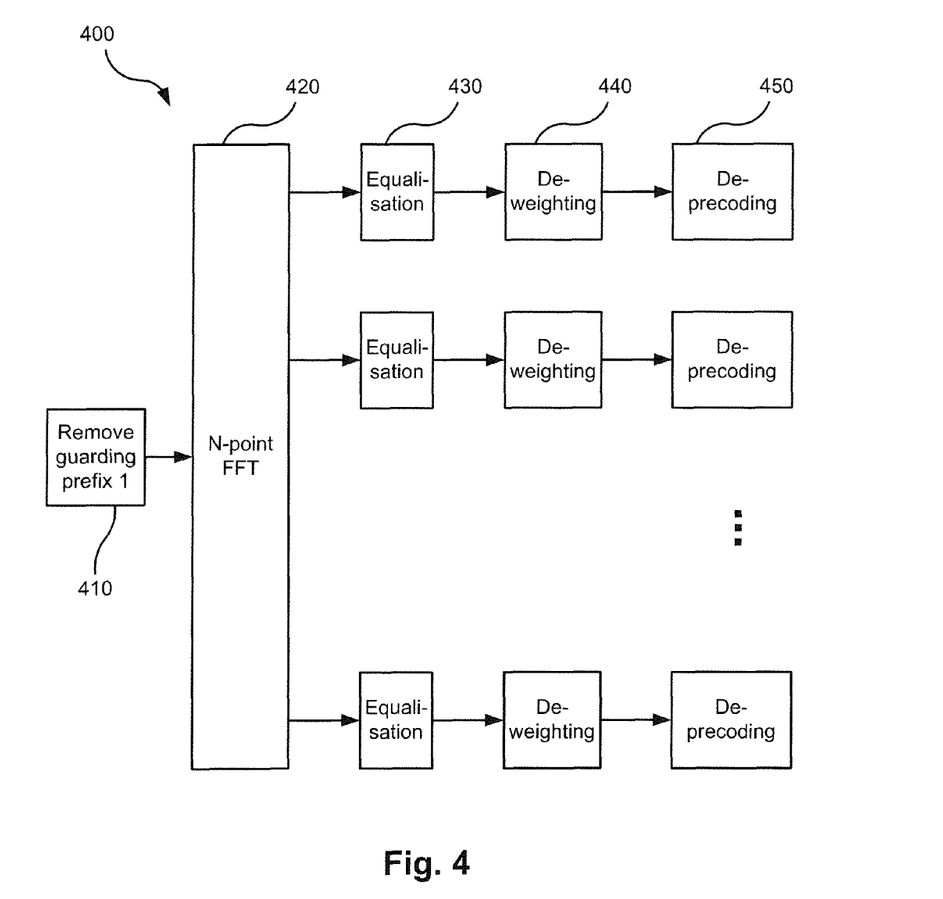
FIG. 4 is a block diagram of a receiver that is complementary to the transmitter of FIG. 2, within which embodiments of the invention may be practised.

FIG. 4 is a block diagram of a receiver 400 that is complementary to the transmitter 200, and within which embodiments of the invention may be practised. The guarding prefix removing module 410 removes the guarding prefix from the (baseband) time-domain received symbol. The demodulation module 420 converts the time-domain received symbol to a symbol sequence. In the OFDM case, the demodulation module 420 is an N-point Fast Fourier Transform (FFT) module. An equalisation module, e.g. 430, then extracts a demodulated symbol sequence corresponding to each subband (e.g. subband 1) according to the allocation of subcarriers to each subband used in the transmitter 200, equalises the symbol sequence in that subband based on the channel characteristics, and removes the distortion caused by the sidelobe suppression module 210 in the transmitter 200 and thereby recover the input symbol vector z in that subband as described below. The data symbols $\tilde{s}$ allocated to that subband may then be recovered from z. A de-weighting module 440 is then applied to remove the weighting introduced by the weighting module 260 in the transmitter 200. A de-precoding module, e.g. 450, is then applied to undo the precoding applied by the precoding module 250 in the transmitter 200. For precoding OFDM systems such as DFT-OFDM, the de-precoding module 450 performs an IFFT operation.

Three implementations of the equalisation module 430 are described below: ISI-free zero-forcing, minimum mean-squared error (MMSE), and Principal Subspace Approximation (PSA).

ISI-Free Zero-Forcing:

Consider a multipath channel with frequency domain coefficients $h_i$ (i=0, . . . , M−1) corresponding to the M subcarriers in a subband. The received symbol vector $\tilde{y}$ in that subband after the demodulation module 420 can be expressed as $$\tilde{y} = D\tilde{x} + \tilde{n} \quad (15)$$

where D is an M-by-M diagonal matrix with diagonal elements equal to $h_i$, and $\tilde{n}$ is an additive white Gaussian noise M-vector with zero mean and variance $\sigma_n^2$.

The equalisation module 430 implements zero-forcing equalisation defined as a channel inversion:

$$\tilde{r} = \frac{1}{\sqrt{\lambda}} D^{-1} \tilde{y} \quad (16)$$

Using equations (9) and (15), the equalised symbol vector $\tilde{r}$ may be written as $$\tilde{r} = Pz + \frac{1}{\sqrt{\lambda}} D^{-1} \tilde{n} \quad (17)$$

As mentioned above, the input vector z cannot be recovered by pre-multiplying the equalised symbol vector $\tilde{r}$ by an inverse $P^{-1}$ of P, since P in general has no inverse.

Instead, define $\tilde{r}_r$ and $\tilde{r}_d$ as q- and (M−q)-sub-vectors extracted from the equalised symbol vector $\tilde{r}$ with indices corresponding to the reserved subcarriers in the set S and the data subcarriers, respectively. D, C, and $\tilde{n}$ may likewise be partitioned into respective "reserved" and "data" partitions $D_r$ (q by q) and $D_d$ ((M−q) by (M−q)), $C_r$ (q by p) and $C_d$ ((M−q) by p), $\tilde{n}_r$ and $\tilde{n}_d$. Equation (17) then separates into $$\tilde{r}_d = \tilde{s} - C_d(C^TC)^{-1}C_d^T\tilde{s} + \frac{1}{\sqrt{\lambda}} D_d^{-1}\tilde{n}_d \quad (18)$$

for the M−q data subcarriers and $$\tilde{r}_r = 0 - C_r(C^TC)^{-1}C_d^T\tilde{s} + \frac{1}{\sqrt{\lambda}} D_r^{-1}\tilde{n}_r \quad (19)$$

for the q reserved subcarriers. The second term in equation (18) represents ISI that may be cancelled using equation (19).

Since $C_r$ generally has full column rank, i.e. rank $(C_r)$=p, there exists a pseudo-inverse $C_r^{-1}$ of $C_r$ such that $C_r^{-1}C_r=I_p$. Pre-multiplying equation (19) by $C_d C_r^{-1}$, then subtracting from equation (18), gives $$\tilde{r}_d - C_d C_r^{-1} \tilde{r}_r = \tilde{s} + \frac{1}{\sqrt{\lambda}} D_d^{-1} \tilde{n}_d - \frac{1}{\sqrt{\lambda}} C_d C_r^{-1} D_r^{-1} \tilde{n}_r \quad (20)$$

The equalisation module 430 therefore forms an estimate $<\tilde{s}>$ of the data symbols $\tilde{s}$ by forming a de-interference matrix W as $C_d C_r^{-1}$, multiplying W by the vector $\tilde{r}_r$ of equalised symbols corresponding to the reserved subcarriers, and subtracting the product from the vector $\tilde{r}_d$ of equalised symbols corresponding to the data subcarriers:

$$<\tilde{s}> = \tilde{r}_d - C_d C_r^{-1} \tilde{r}_r \quad (21)$$

The effect of forming the de-interference matrix W as $C_d C_r^{-1}$ is to cancel the ISI from the equalised data symbol vector $\tilde{r}_d$.

Minimum Mean-Squared Error (MMSE):

An MMSE implementation of the equalisation module 430 is based on the principle of maximising the block SINR. The block SINR is defined as the mean signal to interference and noise power ratio of the signal, averaged over each block (one OFDM symbol in an OFDM system). The equalisation module 430 first performs zero-forcing equalisation according to equation (16), as in the ISI-free zero-forcing implementation.

A global MMSE solution would compute an (M−q)-by-M matrix $W_g$ satisfying $$W_g = \underset{W}{\mathrm{argmin}} \, \|\tilde{s} - W\tilde{r}\|^2 \quad (22)$$

and would form the estimate $<\tilde{s}>$ as $W_g \tilde{r}$. However, this is too complex to compute efficiently. Instead, the MMSE implementation of the equalisation module 430 computes an (M−q)-by-q de-interference matrix $W_0$ which minimises the expected difference between the input symbol vector and the estimated symbol vector:

$$W_0 = \underset{W}{\text{argmin}} \, E\{\|\tilde{s} - (W\tilde{r}_r + \tilde{r}_d)\|^2\} \quad (23)$$

Defining matrices A and G as $$A = C_d(C^T C)^{-1} C_d^T \quad (24)$$

and $$G = C_r(C^T C)^{-1} C_d^T \quad (25)$$

allows the equalisation module 430 to compute the de-interference matrix $W_0$ as $$W_0 = A G^T \left( G G^T + \frac{\sigma_n^2}{\lambda \sigma_s^2 |D_r|^{-2}} \right)^{-1} \quad (26)$$

where $\sigma_s^2$ is the mean power of the data symbols in $\tilde{s}$.

The equalisation module 430 then forms an estimate $\langle \tilde{s} \rangle$ of the data symbol $\tilde{s}$ from the equalised symbols $\tilde{r}$ by multiplying the de-interference matrix $W_0$ by the reserved symbol partition $\tilde{r}_r$ and subtracting from the data symbol partition $\tilde{r}_d$ as follows:

$$\langle \tilde{s} \rangle = \tilde{r}_d - W_0 \tilde{r}_r \quad (27)$$

In equation (26), $AG^T$ and $GG^T$ are fixed (M−q)-by-q and q-by-q matrices, respectively, both of which can be pre-computed and stored. The term $\sigma_s^2 |D_r|^{-2}$ needs to be updated when the channel characteristics vary, and once that term changes, the equalisation module 430 needs to re-compute the matrix inversion in equation (26). The complexity of this matrix inversion is low when q is small.

Principal Subspace Approximation (PSA):

Forming the pseudo-inverse $C_r^{-1}$ of $C_r$ in the ISI-free zero-forcing implementation is adversely affected by the near-zero singular values of $C_r$. The PSA implementation of the equalisation module 430 instead constructs a de-interference matrix W from only the $p_0$ significant (non-near-zero) singular values of $C_r$, where $p_0 \leq p$. Denoting the singular value decomposition of $C_r$ as $U_r \Sigma_r V_r$, and the $p_0$ significant singular values of $C_r$ as $\{\sigma_{r,0}, \sigma_{r,1}, \ldots, \sigma_{r,p_0-1}\}$, the equalisation module 430 computes a robust pseudo-inverse $C_r^i$ of $C_r$ as follows:

$$C_r^i = V_r^{-1} \text{diag}(\sigma_{r,0}^{-1}, \sigma_{r,1}^{-1}, \ldots, \sigma_{r,p_0-1}^{-1}) U_r^{-1} \quad (28)$$

then forms a de-interference matrix W as $C_d C_r^i$, and finally forms an estimate $\langle \tilde{s} \rangle$ of the data symbols $\tilde{s}$ from the zero-forcing-equalised symbols $\tilde{r}$ as follows:

$$\langle \tilde{s} \rangle = \tilde{r}_d - W \tilde{r}_r \quad (29)$$

The optimal choice of the number $p_0$ of significant singular values of $C_r$ to balance noise enhancement (caused by large $p_0$) and ISI (caused by small $p_0$) is dependent on the scenario in which the PSA implementation is used.

Figure 5A:
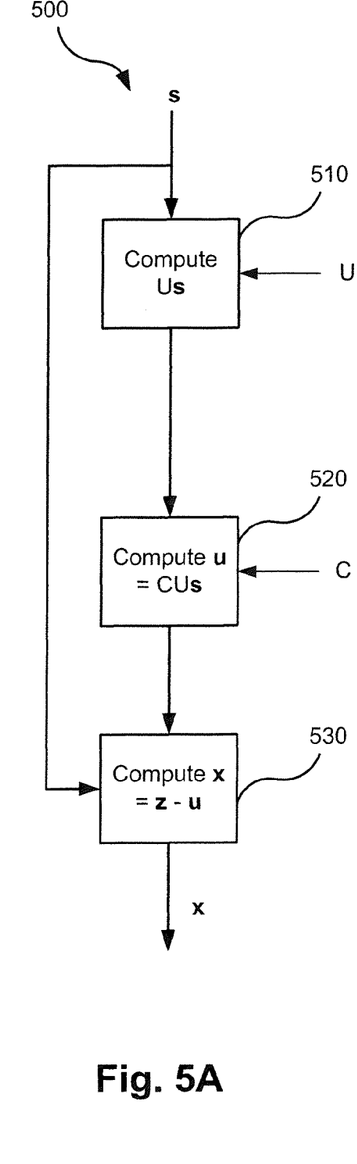
FIG. 5A is a flow chart illustrating an implementation of the sidelobe suppression module in the transmitter of FIG. 2.

FIG. 5A is a flow chart illustrating an implementation 500 of the sidelobe suppression module 210 in the transmitter 200 of FIG. 2, for an even value of q. In the implementation 500, the suppression matrix P is not computed and applied directly. Instead, two data-independent matrices are pre-computed and stored: the M-by-p matrix C (using equation (5)), and a p-by-(M−q) matrix U as $(C^T C)^{-1} C_d^T$, where $C_d$ is a "data partition" of C as defined above.

The module 510 in the implementation 500 multiplies the pre-computed matrix U and the (M−q)-vector $\tilde{s}$ of data symbols to obtain $U\tilde{s}$, requiring p(M−q) multiplications. The module 520 then multiplies the pre-computed matrix C by the output of the module 510 to obtain an M-vector u, using pM multiplications. Finally, the module 530 forms the vector $\tilde{x}$ of precoded symbols in accordance with equation (9), by subtracting the output u of the module 520 from the data symbol M-vector z formed by inserting q zeros into the vector $\tilde{s}$ of data symbols.

Figure 5B:
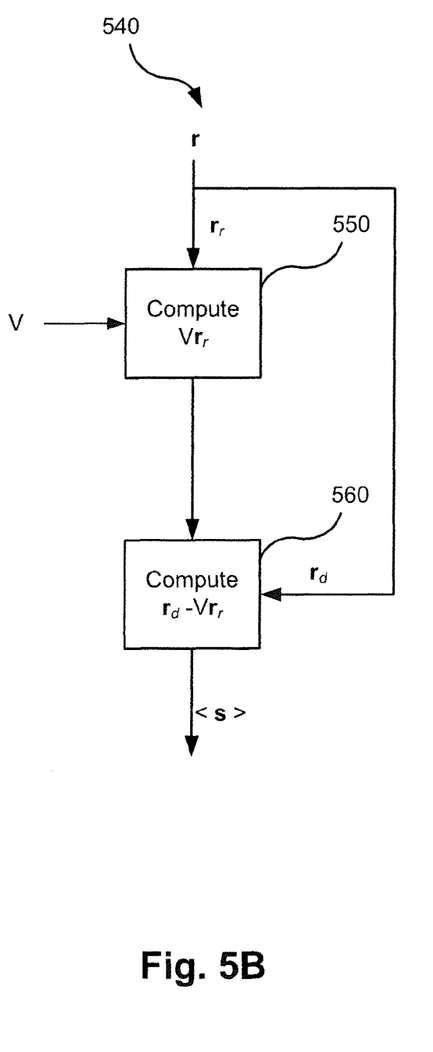
FIG. 5B is a flow chart illustrating an implementation of the de-precoding module in the receiver of FIG. 4.

FIG. 5B is a flow chart illustrating an implementation 540 of part of the equalisation module 430 in the receiver 400 of FIG. 4. A data-independent (M−q)-by-q matrix V has been pre-computed as $C_d C_r^{-1}$, where $C_r$ is a "reserved partition" of C as defined above. The module 550 multiplies the pre-computed matrix V by the "reserved" partition $\tilde{r}_r$ of the equalised symbol vector $\tilde{r}$, requiring p(M−q) multiplications. The module 550 then subtracts the output of the module 550 from the "data" partition $\tilde{r}_d$ of the equalised symbol vector $\tilde{r}$, to obtain the estimate $\langle \tilde{s} \rangle$ of the data symbols $\tilde{s}$ in accordance with equation (21) (the ISI-Free implementation of the equalisation module 430).

Noise enhancement has different impact on conventional OFDM and precoding OFDM systems. Further treatment of the noise enhancement apart from the two equalisers presented above varies from system to system.

For precoded OFDM systems, such as DFT-OFDM systems, the enhanced noise due to the ISI-free receiver is not equally distributed over different information symbols. Instead, the symbols on the two edges of the precoding/FFT input suffer from most noise. To reduce noise enhancement in a DFT-OFDM transmitter due to the precoding carried out in the sidelobe suppression modules, e.g. 210, several points at the two edges of the FFT module inputs can be set to zero symbols.

Another approach to reduce noise enhancement in a DFT-OFDM transmitter with sidelobe suppression is for the weighting module 260 to introduce a phase shift to the pre-coded input symbols before sidelobe suppression. This weighting module 260 can distribute the noise to different symbols.

For conventional OFDM systems, reducing noise enhancement is implemented within the receiver. The approach is to apply a DFT to the symbol estimate vector $\langle \tilde{s} \rangle$ to convert to time domain. Samples which see larger noise power in the DFT output are set to zeros, and an IDFT is then applied to convert the modified time-domain symbol back to frequency domain for symbol de-mapping. Note that this approach is effective only when the average block SNR is so small that the signal energy is not larger than the noise energy at the point where the noise is to be nulled out. In actual implementation, the above steps can be simplified as described below.

The significant noise terms occur at symbols (or subcarriers) with index set $\mu$. Denote the index set of the remaining symbols as $\nu$. The IDFT matrix $F^*$ is divided into two parts $F_\mu^*$ and $F_\nu^*$ according to the index sets $\mu$ and $\nu$:

$$F^* = \begin{pmatrix} F_\mu^* \\ F_\nu^* \end{pmatrix} \quad (30)$$

The noise enhancement reduction process described above can be represented by $$\langle \tilde{s} \rangle_{out} = F_\nu F_\nu^* \langle \tilde{s} \rangle = \langle \tilde{s} \rangle - F_\mu F_\mu^* \langle \tilde{s} \rangle \quad (31)$$

Thus only $2\mu(M-q)$ multiplications are required in this implementation where $\mu$ is the size of the index set $\mu$. In the case where only the first symbol, which is always the largest noise term, is to be removed, $F_\mu^*$ is an all-one row vector, so equation (31) becomes $$<\tilde{s}>_{out} = <\tilde{s}> - \text{mean}(<\tilde{s}>)) \quad (32)$$

Figure 6A:
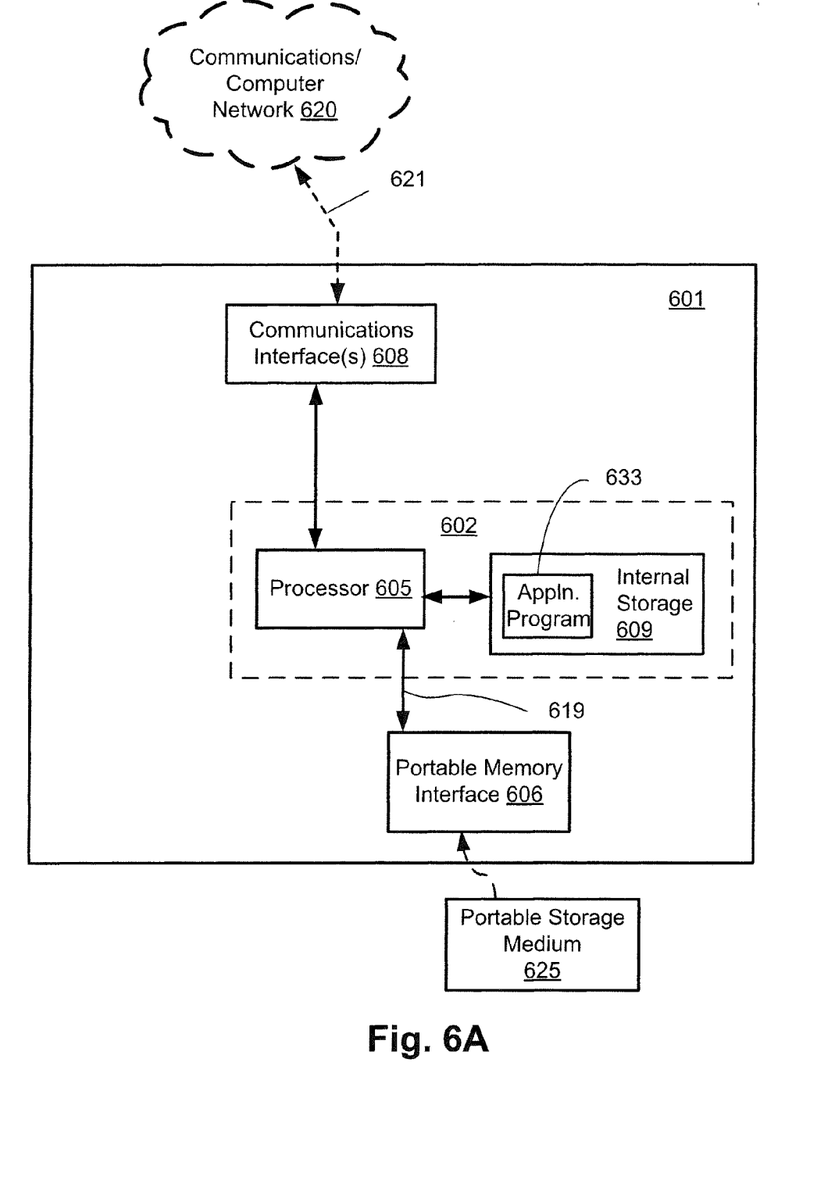
FIGS. 6A and 6B collectively form a schematic block diagram representation of an electronic device on which . . . may be implemented.
Figure 6B:
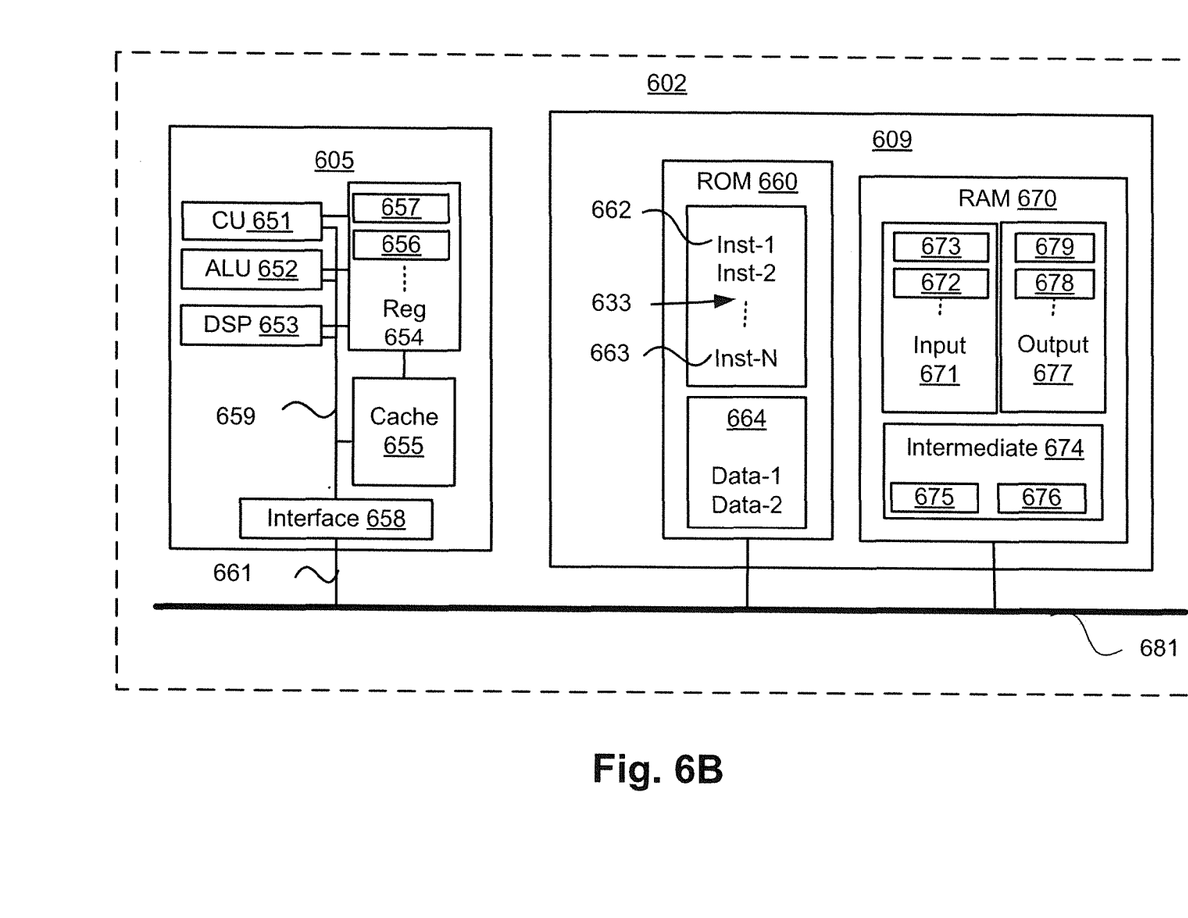

FIGS. 6A and 6B collectively form a schematic block diagram of a general purpose electronic device 601 including embedded components, as which any of the precoding module 250, the weighting module 260, the sidelobe suppression module 210, the equalisation module 430, the de-weighting module 440, and the de-precoding module 450 may be implemented.

As seen in FIG. 6A, the electronic device 601 comprises an embedded controller 602. Accordingly, the electronic device 601 may be referred to as an "embedded device." In the present example, the controller 602 has a processing unit (or processor) 605 which is bi-directionally coupled to an internal storage module 609. The storage module 609 may be formed from non-volatile semiconductor read only memory (ROM) 660 and semiconductor random access memory (RAM) 670, as seen in FIG. 6B. The RAM 670 may be volatile, non-volatile or a combination of volatile and non-volatile memory.

As seen in FIG. 6A, the electronic device 601 also comprises a portable memory interface 606, which is coupled to the processor 605 via a connection 619. The portable memory interface 606 allows a complementary portable computer readable storage medium 625 to be coupled to the electronic device 601 to act as a source or destination of data or to supplement the internal storage module 609. Examples of such interfaces permit coupling with portable computer readable storage media such as Universal Serial Bus (USB) memory devices, Secure Digital (SD) cards, Personal Computer Memory Card International Association (PCMIA) cards, optical disks and magnetic disks.

The electronic device 601 also has a communications interface 608 to permit coupling of the electronic device 601 to a computer or communications network 620 via a connection 621. The connection 621 may be wired or wireless. For example, the connection 621 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The methods carried out by the sidelobe suppression module 210 and the equalisation module 430 may be implemented as one or more software application programs 633 executable within the embedded controller 602. In particular, with reference to FIG. 6B, the steps of the methods are effected by instructions in the software 633 that are carried out within the embedded controller 602. The software instructions may be formed as one or more code modules, each for performing one or more particular tasks.

The software 633 of the embedded controller 602 is typically stored in the non-volatile ROM 660 of the internal storage module 609. The software 633 stored in the ROM 660 can be updated when required from a computer readable medium. The software 633 can be loaded into and executed by the processor 605. In some instances, the processor 605 may execute software instructions that are located in RAM 670. Software instructions may be loaded into the RAM 670 by the processor 605 initiating a copy of one or more code modules from ROM 660 into RAM 670. Alternatively, the software instructions of one or more code modules may be pre-installed in a non-volatile region of RAM 670 by a manufacturer. After one or more code modules have been located in RAM 670, the processor 605 may execute software instructions of the one or more code modules.

The application program 633 is typically pre-installed and stored in the ROM 660 by a manufacturer, prior to distribution of the electronic device 601. However, in some instances, the application programs 633 may be supplied to the user encoded on the computer readable storage medium 625 and read via the portable memory interface 606 of FIG. 6A prior to storage in the internal storage module 609. Computer readable storage media refers to any non-transitory tangible storage medium that participates in providing instructions and/or data to the embedded controller 602 for execution and/or processing. Examples of such storage media include floppy disks, magnetic tape, CD-ROM, DVD, a hard disk drive, a ROM or integrated circuit, USB memory, a magneto-optical disk, flash memory, or a computer readable card such as a PCMCIA card and the like, whether or not such devices are internal or external of the electronic device 601. A computer readable medium having such software or computer program recorded on it is a computer program product. The use of such a computer program product in the electronic device 601 effects an apparatus for sidelobe suppression, equalisation, or de-precoding, depending on the method.

In another alternative, the software application program 633 may be read by the processor 605 from the network 620, or loaded into the embedded controller 602 from other computer readable media. Examples of transitory or non-tangible computer readable transmission media that may also participate in the provision of software, application programs, instructions and/or data to the electronic device 601 include radio or infra-red transmission channels as well as a network connection to another computer or networked device, and the Internet or Intranets including e-mail transmissions and information recorded on Websites and the like.

The second part of the application programs 633 and the corresponding code modules mentioned above may be executed to implement one or more graphical user interfaces (GUIs) to be rendered or otherwise represented upon the display 614 of FIG. 6A. Through manipulation of the user input device 613 (e.g., the keypad), a user of the electronic device 601 and the application programs 633 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 6B illustrates in detail the embedded controller 602 having the processor 605 for executing the application programs 633 and the internal storage 609. The internal storage 609 comprises read only memory (ROM) 660 and random access memory (RAM) 670. The processor 605 is able to execute the application programs 633 stored in one or both of the connected memories 660 and 670. When the electronic device 601 is initially powered up, a system program resident in the ROM 660 is executed. The application program 633 permanently stored in the ROM 660 is sometimes referred to as "firmware". Execution of the firmware by the processor 605 may fulfil various functions, including processor management, memory management, device management, storage management and user interface.

The processor 605 typically includes a number of functional modules including a control unit (CU) 651, an arithmetic logic unit (ALU) 652 and a local or internal memory comprising a set of registers 654 which typically contain atomic data elements 656, 657, along with internal buffer or cache memory 655. One or more internal buses 659 interconnect these functional modules. The processor 605 typically also has one or more interfaces 658 for communicating with external devices via system bus 681, using a connection 661.

The application program 633 includes a sequence of instructions 662 though 663 that may include conditional branch and loop instructions. The program 633 may also include data, which is used in execution of the program 633. This data may be stored as part of the instruction or in a separate location 664 within the ROM 660 or RAM 670.

In general, the processor 605 is given a set of instructions, which are executed therein. This set of instructions may be organised into blocks, which perform specific tasks or handle specific events that occur in the electronic device 601. Typically, the application program 633 waits for events and subsequently executes the block of code associated with that event. Events may be triggered in response to input from a user, via the user input devices 613 of FIG. 6A, as detected by the processor 605. Events may also be triggered in response to other sensors and interfaces in the electronic device 601.

The execution of a set of the instructions may require numeric variables to be read and modified. Such numeric variables are stored in the RAM 670. The disclosed method uses input variables 671 that are stored in known locations 672, 673 in the memory 670. The input variables 671 are processed to produce output variables 677 that are stored in known locations 678, 679 in the memory 670. Intermediate variables 674 may be stored in additional memory locations in locations 675, 676 of the memory 670. Alternatively, some intermediate variables may only exist in the registers 654 of the processor 605.

The execution of a sequence of instructions is achieved in the processor 605 by repeated application of a fetch-execute cycle. The control unit 651 of the processor 605 maintains a register called the program counter, which contains the address in ROM 660 or RAM 670 of the next instruction to be executed. At the start of the fetch execute cycle, the contents of the memory address indexed by the program counter is loaded into the control unit 651. The instruction thus loaded controls the subsequent operation of the processor 605, causing for example, data to be loaded from ROM memory 660 into processor registers 654, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 633, and is performed by repeated execution of a fetch-execute cycle in the processor 605 or similar programmatic operation of other independent processor blocks in the electronic device 601.

The precoding module 250, the weighting module 260, the sidelobe suppression module 210, the equalisation module 430, the de-weighting module 440, and the de-precoding module 450 may alternatively be implemented in dedicated hardware such as one or more integrated circuits performing the functions or sub functions of the modules respectively. Such dedicated hardware may include graphic processors, digital signal processors, or one or more microprocessors and associated memories.

The arrangements described are applicable to the broadband communication industries.

The foregoing describes only some embodiments of the present invention, and modifications and/or changes can be made thereto without departing from the scope and spirit of the invention, the embodiments being illustrative and not restrictive.

What is claimed is:

1. A receiver for a communication system over a channel, the receiver comprising:
    a demodulation module configured to convert a time-domain received symbol to a vector of received symbols, each received symbol corresponding to a subcarrier, each subcarrier being a data subcarrier or a reserved subcarrier on which a zero symbol was transmitted;
    an equalization module configured to:
        equalize the received symbol vector based on the characteristics of the channel, and
        estimate an input symbol vector from the equalized symbol vector;
    a de-weighting module configured to remove weighting from the estimated input symbol vector; and
    a de-precoding module configured to remove precoding from the de-weighted input symbol vector.

2. The receiver according to claim 1, wherein the equalization module is further configured to multiply the received symbol vector by a matrix that inverts the channel frequency characteristics.

3. The receiver according to claim 1, wherein the equalization module is further configured to estimate the input symbol vector by:
    multiplying a de-interference matrix by a vector or equalized symbols corresponding to the reserved subcarriers; and
    subtracting the product from a vector or equalized symbols corresponding to the data subcarriers.

4. The receiver according to claim 3, wherein the de-interference matrix is configured to cancel inter-symbols interference from the vector of equalized symbols corresponding to the data subcarriers.

5. The receiver according to claim 4, wherein the de-interference matrix is further configured to minimize the expected difference between the input symbol vector and the estimated input symbol vector.

6. The receiver according to claim 5, wherein the de-interference matrix is constructed to balance inter-symbol interference in the vector or equalized symbols corresponding to the data subcarriers, and noise enhancement.

7. A method of receiving a symbol sequence over a communication channel, the method comprising:
    converting a time-domain received symbol to a vector of received symbols, each received symbol corresponding to a subcarrier, each subcarrier being a data subcarrier or a reserved subcarrier on which a zero symbol was transmitted;
    equalizing the received symbol vector based on the characteristics of the channel;
    estimating the symbol sequence from the equalized symbol vector;
    removing weighting from the estimated input symbol vector; and
    removing precoding from the de-weighted input symbol vector.

8. The method according to claim 7, further comprising:
    multiplying the received symbol vector by a matrix that inverts the channel frequency characteristics.

9. The method according to claim 7, further comprising:
multiplying a de-interference matrix by a vector or equalized symbols according to the reserved subcarriers; and
subtracting the product from a vector or equalized symbols corresponding to the data subcarriers.

10. The method according to claim 7, further comprising:
cancelling inter-symbols interference from the vector of equalized symbols corresponding to the data subcarriers.

11. The method according to claim 7, further comprising:
minimizing the expected difference between the input symbol vector and the estimated input symbol vector.

12. The method according to claim 7, further comprising:
balancing inter-symbol interference in the vector or equalized symbols corresponding to the data subcarriers, and noise enhancement.

* * * * *